United States Patent
Fu et al.

(10) Patent No.: US 10,237,714 B2
(45) Date of Patent: Mar. 19, 2019

(54) METHOD AND SYSTEM FOR BLUETOOTH COMMUNICATION, AND ELECTRONIC DEVICE

(71) Applicant: SMARTECH WORLDWIDE LIMITED, Tortola (VG)

(72) Inventors: Yunhe Fu, Shenzhen (CN); Martin Yeung-Kei Chui, Hong Kong (CN); Mid Wang, Hong Kong (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/821,874

(22) Filed: Nov. 24, 2017

(65) Prior Publication Data

US 2018/0176714 A1    Jun. 21, 2018

(30) Foreign Application Priority Data

Dec. 19, 2016   (CN) .......................... 2016 1 1179699

(51) Int. Cl.
| | |
|---|---|
| H04B 7/00 | (2006.01) |
| H04W 4/80 | (2018.01) |
| H04W 28/04 | (2009.01) |
| H04L 29/08 | (2006.01) |

(52) U.S. Cl.
CPC ........... *H04W 4/80* (2018.02); *H04L 67/2819* (2013.01); *H04W 28/04* (2013.01)

(58) Field of Classification Search
CPC ..... H04W 28/04; H04W 4/008; H04B 5/0031
See application file for complete search history.

(56) References Cited

U.S. PATENT DOCUMENTS

| | | | |
|---|---|---|---|
| 2002/0028658 A1* | 3/2002 | Ami | ....................... H04H 60/92 455/41.2 |
| 2012/0058727 A1 | 3/2012 | Cook et al. | |

FOREIGN PATENT DOCUMENTS

| | | |
|---|---|---|
| CN | 103985234 A | 8/2014 |
| CN | 104519493 A | 4/2015 |

* cited by examiner

*Primary Examiner* — Tuan Pham
(74) *Attorney, Agent, or Firm* — Na Xu; IPro, PLLC (57) ABSTRACT

A method and a system for Bluetooth communication, and an electronic device are disclosed. The method includes: acquiring data packets from a data source device by means of data interception within at least a portion of a time period in a Bluetooth communication process, wherein the data interception is a working mode that allows unidirectional acquisition of data packets delivered by the data source device in the Bluetooth communication process.

13 Claims, 4 Drawing Sheets

METHOD AND SYSTEM FOR BLUETOOTH COMMUNICATION, AND ELECTRONIC DEVICE

CROSS-REFERENCE TO RELATED APPLICATIONS

The present disclosure claims priority to Chinese Patent Application No. 201611179699.8, filed with the Chinese Patent Office on Dec. 19, 2016, titled "METHOD, APPARATUS AND SYSTEM FOR BLUETOOTH COMMUNICATION, AND ELECTRONIC DEVICE", the entire contents of which are incorporated herein by reference.

TECHNICAL FIELD

The present disclosure relates to the technical field of Bluetooth, and in particular, relates to a method and a system for Bluetooth communication, and an electronic device.

BACKGROUND

Various types of wireless transmission devices, for example, smart phones, Bluetooth headphones, MP3 players and the like, have been extensively applied. Most wireless transmission devices support Bluetooth transmission of audios and other types of data. In the Bluetooth protocol (A2DP profile), one data output source (for example, a smart phone, an MP3 player or the like) may be only connected to one audio playback device, and transmit data via Bluetooth to the audio playback device for playback.

In some scenarios, the data output source needs to transmit data to two or more audio playback devices. For example, the stereo headphone requires that left and right-channel playback devices are both wirelessly connected to the data output source. In case of data reception, the playback device in one channel (for example, the left headphone) only acts as a primary headphone to receive the data transmitted by the data output source. Then the data is transmitted to the playback device in the other channel via Bluetooth or other non-Bluetooth transmission protocols.

SUMMARY

An embodiment of the present disclosure provides a method for Bluetooth communication. The method includes:
acquiring data packets from a data source device by means of data interception within at least a portion of a time period in a Bluetooth communication process, wherein the data interception is a working mode that allows unidirectional acquisition of data packets delivered by the data source device in the Bluetooth communication process.

Another embodiment of the present disclosure provides an electronic device. The electronic device includes:
a memory; and
a processor coupled to the memory, the memory storing instructions that are executable by the processor; wherein execution of the instructions by the processor causes the processor to:
acquire data packets from a data source device by means of data interception within at least a portion of a time period in a Bluetooth communication process, wherein the data interception is a working mode that allows unidirectional acquisition of data packets delivered by the data source device in the Bluetooth communication process.

Still another embodiment of the present disclosure provides a system for Bluetooth communication. The system includes: a data source device configured to provide data, a data receiving device configured to establish Bluetooth communication with the data source device, and at least one secondary device; wherein
the secondary device is configured to acquire data packets from the data source device by means of data interception within at least a portion of a time period in a Bluetooth communication process between the data source device and the data receiving device; and wherein
the data interception is a working mode that allows unidirectional acquisition of data packets delivered by the data source device in the Bluetooth communication process.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

In Bluetooth, a Bluetooth device does not need to fulfill all the Bluetooth specifications. For compatibility between different Bluetooth devices, some application layer-specific profiles are defined in the Bluetooth specifications, and these profiles are used to define how to implement a connection or application between the Bluetooth devices.

The Advanced Audio Distribution Profile (A2DP) is a subset in the above described Bluetooth profiles. A2DP is dedicated to transfer of stereo music via the Bluetooth. In a case where two Bluetooth devices both support A2DP, the stereo music may be transferred via the Bluetooth.

Figure 1:
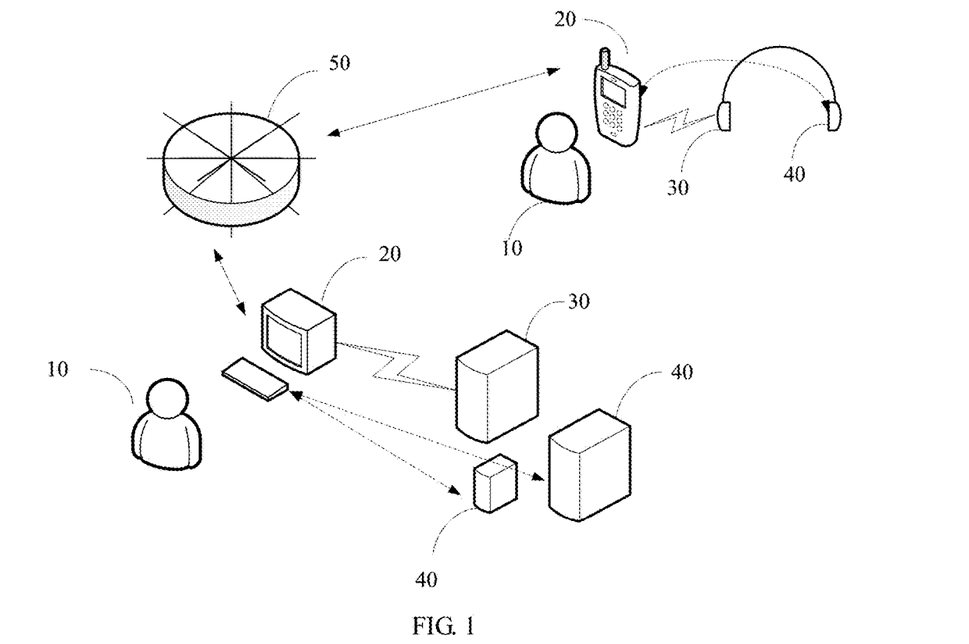
FIG. 1 is a schematic diagram of an application environment according to an embodiment of the present disclosure.

FIG. 1 illustrates an application environment where stereo music is transferred via A2DP according to an embodiment of the present disclosure. As illustrated in FIG. 1, the application environment includes: a user 10, a data source output device 20, a multi-channel playback device (including a first audio playback device 30 and a second audio playback device 40), and a network 50.

The user 10 may be a group having the same or similar operation behaviors in any number, for example, a family, a work group or individuals. The user 10 may interact with the data source output device 20 and/or the multi-channel playback device by using one or a plurality of user interaction device of any suitable type, for example, a mouse, a keypad, a remote control, a touch screen, a motion sensing camera, or a smart wearable device. The user 10 input instructions or control the data source output device 20 and/or the multi-channel playback device to perform one or a plurality of operations, for example, an audio playback operation.

The data source output device 20 may be a suitable electronic device that supports A2DP and provides one or a plurality of audio contents, for example, a smart phone, a tablet computer, an MP3 player, a personal computer, a laptop computer, a personal audio device, a CD player, or any other smart/non-smart terminal device. The data source output device 20 is coupled to at least one storage medium configured to store audio data, and acquires audio data. The data source output device 20 may also be a combination of one or a plurality of electronic devices, for example, a smart phone and a digital-to-analog converter (DAC) connected thereto.

The multi-channel playback device may include a first audio playback device 30 and a second audio playback device 40. The multi-channel playback device may be a suitable electronic device that supports A2DP and is capable of playing audio data, for example, a stereo headphone, a 2.1 channel speaker, a 5.1 channel audio device, a stereo speaker or any other suitable speaker group. The first audio playback device 30 and the second audio playback device 40 are merely used to represent speaker parts that play audio data in different channels. For example, with respect to stereo audio data, the first audio playback device 30 may be a left-channel headphone, and the second audio playback device 40 is a right-channel headphone. Nevertheless, the first audio playback device 30 may also be a right-channel headphone, and the second audio playback device 40 may also be a left-channel headphone.

The data source output device 20 may establish a Bluetooth connection with the multi-channel audio playback device according to a user instruction, and transfer audio data based on A2DP. In an exemplary embodiment, the data source output device 20 may establish a Bluetooth connection with the first audio playback device 30, and provide some related information.

The network 50 may be a suitable wired or wireless network that implements communication between two electronic devices, for example, the Internet, a local area network or a cabled network. The data source output device 20 has at least one network interface, establishes a communication connection with the network 50, and acquires corresponding audio data or instructions from the network 50. Nevertheless, the data source output device 20 may also have at least one local storage device, and acquire corresponding audio data from the local storage device.

In some other embodiments, some devices may be added or removed according to the actual needs. For example, the network 50 may be removed or an additional user interaction device may be added.

The user 10 sends an instruction to the data source output device 20 (for example, a smart phone), and the data source output device 20 delivers audio data to the first audio playback device 30 based on A2DP according to the related instruction.

In the process that the data source output device 20 delivers the audio data, the second audio playback device 40 is in a working mode of data interception, and intercepts the delivered audio data to acquire the audio data.

A communication channel is established between the first audio playback device 30 and the second audio playback device 40 for data transmission. In some embodiments, the first audio playback device 30 and the second audio playback device 40 may also use Bluetooth communication, some information desired by the second audio playback device 40 for data interception, for example, connection information related to the data source output device 20, may be transmitted from the first audio playback device 30 to the second audio playback device 40 via the Bluetooth communication.

For description brevity, the first audio playback device 30 connected to the data source output device 20 via the Bluetooth may be referred to as a primary device, and the second audio playback device 40 accessed via data interception may be referred to as a secondary device. Nevertheless, data interception is an incomplete unidirectional communication, and integrity of the data acquired based on such communication may not be ensured.

FIG. 1 only illustrates two users 10, two data source output devices 20, two first audio playback devices 30, and three second audio playback devices 40. However, a person skilled in the art should understand that in practical application, the application environment may include more users 10, more data source output devices 20, more first audio playback devices 30 or more second audio playback devices 40.

In addition, the application environment according to the embodiment as illustrated in FIG. 1 is described using A2DP-based Bluetooth audio transmission as an example. However, the method for Bluetooth communication according to the embodiment of the present disclosure may also be applied to any suitable scenario where data needs to be transmitted from one data source output device to a plurality of different data receiving devices via Bluetooth transmission, but is not limited to application of stereo audio transmission based on A2DP.

Figure 2:
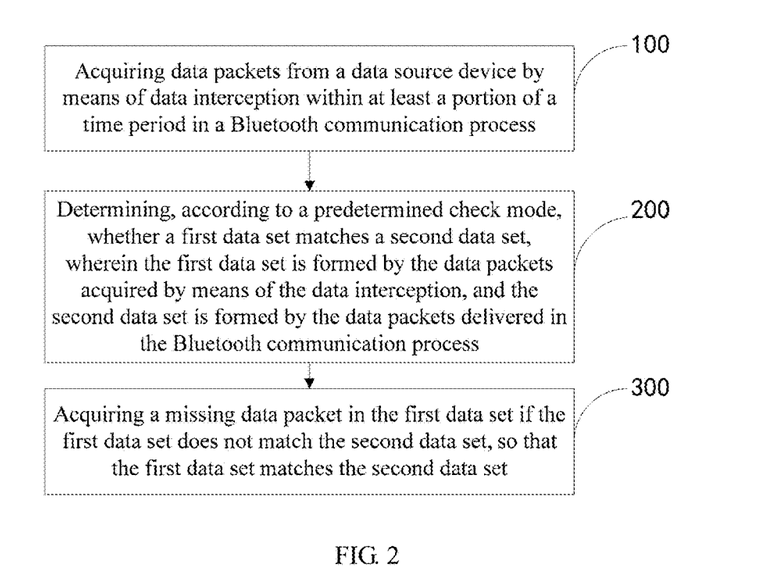
FIG. 2 is a flowchart of a method for Bluetooth communication according to an embodiment of the present disclosure.

FIG. 2 is a flowchart of a method for Bluetooth communication of a first audio playback device 30 or a second audio playback device 40. In the embodiment, the first audio playback device 30 is a primary device in a stereo headphone whereas the second audio playback device 40 is a secondary device in the stereo headphone. As illustrated in FIG. 2, the method includes the following steps:

100: Data packets from a data source device are acquired by means of data interception within at least a portion of a time period in a Bluetooth communication process. The data interception is a working mode that allows unidirectional acquisition of data packets delivered by the data source device in the Bluetooth communication process.

The Bluetooth communication process is a process that data is transmitted between the data source output device 20 and the first audio playback device 30 (that is, the primary headphone) based on the Bluetooth communication. This communication process is based on A2DP, and implements normal point-to-point data transmission.

In this process, the first audio playback device 30 and the second audio playback device 40 are both connected via the Bluetooth. Therefore, after some necessary connection information is acquired from the first audio playback device 30, the second audio playback device 40 may enter the working mode of data interception and acquire data delivered by the data source output device 20.

Relative to the Bluetooth connection between the first audio playback device 30 and the data source output device 20, the second audio playback device 40 employs a unidirectional data transmission mode. That is, in the working mode of data interception, the second audio playback device 40 only unidirectionally acquires data output by the data source output device 20 but fails to send feedback information indicating details of data reception to the data source output device 20.

Under A2DP, although the data source output device 20 is only allowed to establish a communication connection with one audio playback device, other audio playback devices that need to receive the same data may access the data source output device 20 based on the working mode of data interception to acquire the delivered audio data.

In some embodiments, the second audio playback device 40 may enter the working mode of data interception in different time segments in the Bluetooth communication process, instead of being synchronous with the Bluetooth communication process. For example, if the electronic device is a 2.1 channel audio device, the audio playback device for providing the bass part enters the working mode of data interception only upon receiving an instruction of starting the bass part from the user, and acquires the data delivered by the data source output device.

By means of the above data interception, a plurality of audio playback devices may also acquire the data delivered by the data source output device 20 and play the audio data, with no need of an additional data forwarding process. In this way, data load in the case of stereo audio or other cases where multi-channel data transmission is desired may be better reduced, and thus the bandwidth occupied for data forwarding is reduced.

As described in the above embodiment, the working mode of data interception is not a bidirectional communication process, and the audio playback device fails to provide details of data reception to the data source output device. Therefore, such mechanisms as handshake, Bluetooth baseband processing or re-transmission or the like may not be employed to ensure completeness of data integrity in the data transmission process. In some embodiments, the following steps may be performed to ensure data integrity of the audio playback device.

200: Whether a first data set matches a second data set is determined, according to a predetermined check mode, wherein the first data set is formed by the data packets acquired by means of the data interception, and the second data set is formed by the data packets delivered in the Bluetooth communication process.

As described above, in the application environment, the data source output device may be in normal Bluetooth communication with one audio playback device (for description brevity, the audio playback device is referred to as the primary device). The primary device and the data source output device are in a standard Bluetooth communication, wherein the bidirectional communication is allowed, and different mechanisms are employed to ensure data integrity in the data transmission. Therefore, the second data set received by the primary device may be considered as the integral data.

The other audio playback devices (hereinafter referred to as the secondary devices) may compare their acquired first data set with the second data set by means of some suitable check modes to determine whether the first data set matches the second data set. If the first data set does not match the second data set, the other audio playback devices determine a different part therebetween (for example, specifically a data packet missing in the first data set relative to the second data set). Wherein, the other audio playback devices are devices that accessed into the data transmission of the data source output device.

300: A missing data packet in the first data set is acquired if the first data set does not match the second data set, so that the first data set matches the second data set.

If the first data set does not match the second data set, the secondary device may request the primary device to send the different part (for example, the missing data packet) therebetween via the Bluetooth or other suitable communication modes, to ensure that the data packets received by the secondary device and the primary device are consistent.

Through the above steps, the data received by the secondary device is consistent with the data received by the primary device (the first data set and the second data set), so that the data acquired by the secondary device has better integrity. Compared with forwarding all the data by the primary device to the secondary device, in the embodiment, only the different part between the first data set and the second data set needs to be forwarded. In this way, data needs to be forwarded is greatly reduced, and thus the data transmission load and the occupied data bandwidth are better reduced.

Figure 3:
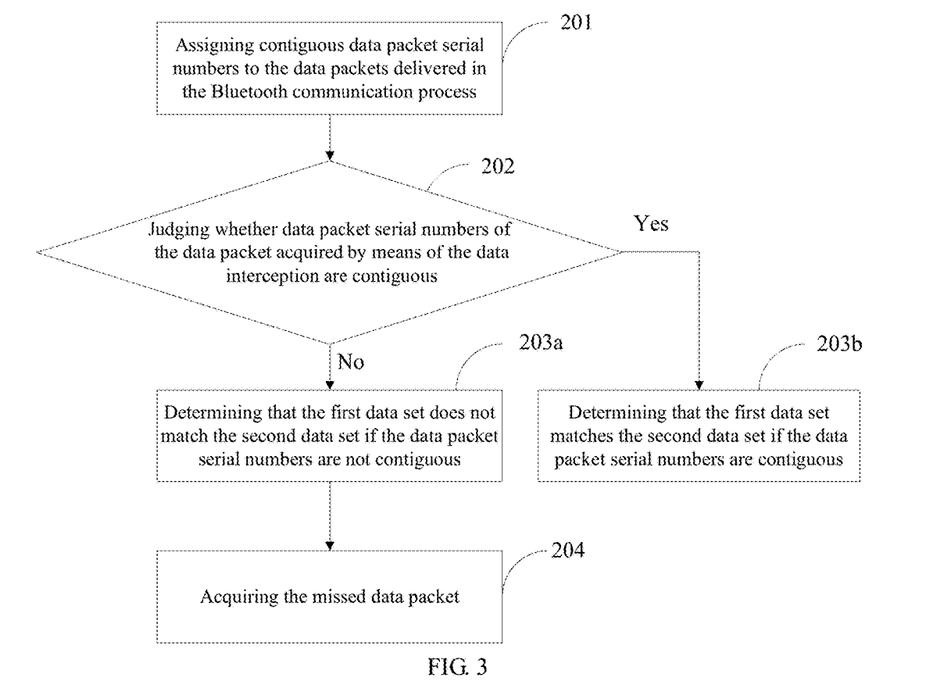
FIG. 3 is a flowchart of a method for Bluetooth communication according to another embodiment of the present disclosure.

In some embodiments, whether the first data set matches the second data set may be specifically determined according to the check mode based on the data packet serial numbers. FIG. 3 is a flowchart of a checking method based on the data packet serial numbers according to an embodiment of the present disclosure.

As illustrated in FIG. 3, the checking method specifically includes the following steps:

201: Contiguous data packet serial numbers are assigned to the data packets delivered in the Bluetooth communication process.

Delivery of the output data from the data source output device 20 may be practiced in the form of continuous and one-by-one transmission of the data packets. Each data packet contains a specific amount of information, including audio data and transmitted data. Therefore, it may be considered that in the second data set, the data packet serial numbers are contiguous.

202: Whether data packet serial numbers of the data packet acquired by means of the data interception are contiguous is judged. Step 203*a* is performed if the data packet serial numbers are not contiguous. Step 203*b* is performed if the data packet serial numbers are contiguous.

Figure 4:
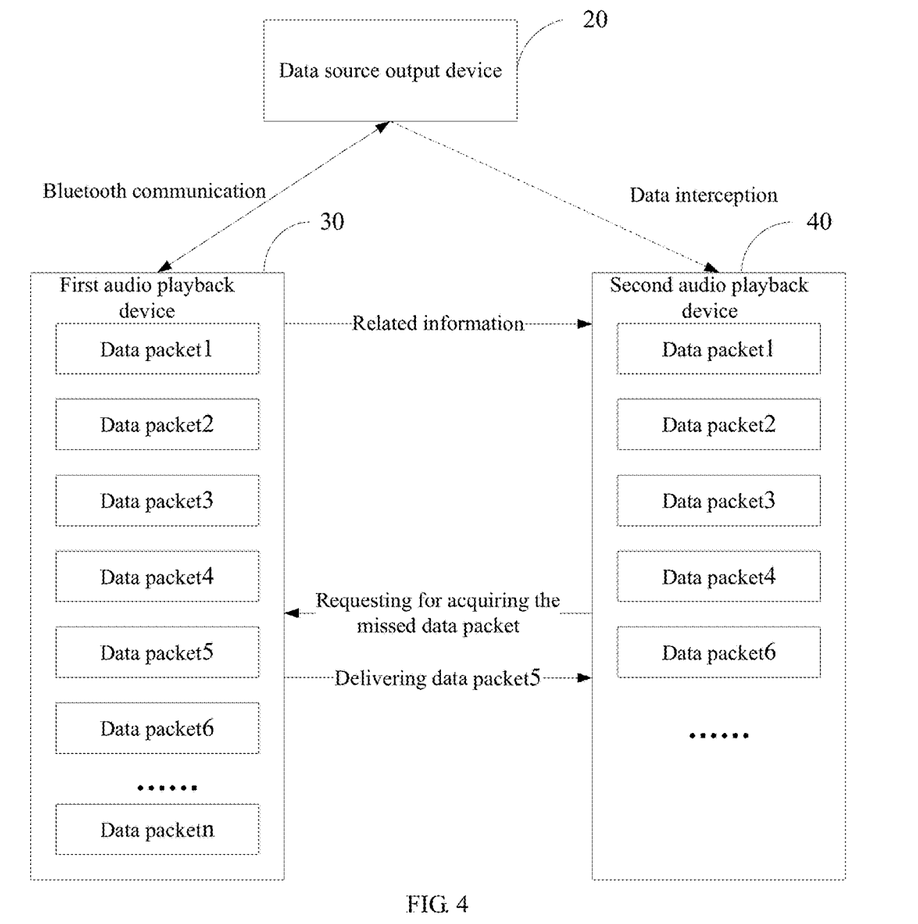
FIG. 4 is a schematic structural block diagram illustrating data interception according to an embodiment of the present disclosure.

The secondary device identifies the received data packets and determines the data packet serial numbers. After the data packets are sequenced according to a time sequence of the received data packets, whether the data packet serial numbers are contiguous may be determined. For example, as illustrated in FIG. 4, after the data packet with a serial number 4 is received, and the serial number of a next data packet to be received is 6, the data packet serial numbers are not contiguous.

203*a*: It is determined that the first data set does not match the second data set.

203*b*: It is determined that the first data set matches the second data set if the data packet serial numbers are contiguous.

Step 202 may be a repeated process. With the continuous advancement of the working mode of data interception, whether the data packet serial numbers are contiguous is judged to determine whether the data acquired by means of the data interception is integral. If the first data set matches the second data set, the secondary device may further perform data interception, acquire the data and play the acquired data. On the contrary, if the first data set does not match the second data set, it indicates that a data packet is missing, and an additional operation needs to be performed to ensure data integrity.

In some embodiments, the missing data packet may be acquired by the following steps. Firstly, according to the data packet serial numbers, a data packet missed in the first data set relative to the second data set may be determined. For example, as illustrated in FIG. 4, when the serial number of a next data packet of the data packet with the serial number 4 is 6, wherein the data packets are sequenced according to an acquired time sequence, it may be determined that a data packet with the serial number 5 is missing, and this data packet needs to be re-acquired.

Afterwards, the missed data packet is acquired using a data receiving device (that is, the primary device) that receives the data packets delivered in the Bluetooth communication process (step 204). In some embodiments, a wireless transmission mode based on the Bluetooth may be employed between the secondary device and the primary device, the primary device provides the corresponding data packet missed in the data interception for various secondary devices. Further, in some other embodiments, the missed data packet may be transmitted using other data transmission modes.

By means of the checking and data transmission between the primary device and the secondary device, integrity of the data acquired by the secondary device in the working mode of data interception may be ensured. To meet the actual needs, some steps may be added or reduced, for example, adding a check bit, to ensure correct reception of the data and the like.

In the above embodiments, some approaches are provided to judge whether the secondary device has a missing data packet according to the data packet serial numbers and to determine which data packet is missing. In some other embodiments, other different types of check symbols for identifying the data packets may also be used to judge integrity of the data acquired by the secondary device by means of the working mode of data interception.

Similar to the checking method based on the data packet serial numbers, the secondary device may identify the acquired check symbols of the data packets, and hence judge whether the check symbols thereof are the same as the check symbols of the integral data packets, to determine whether data packets are missing and determine the specific missed data packets. Nevertheless, different check symbols and data packet serial numbers may be used in combination, so as to further improve accuracy of the judgment.

FIG. 4 is a schematic structural block diagram illustrating data interception and checking by a secondary device according to an embodiment of the present disclosure. As illustrated in FIG. 4, the data source output device 20 establishes a Bluetooth connection with the first audio playback device 30, and sequentially transmits data packets 1 to n via Bluetooth communication. The second audio playback device 40 acquires information related to the data interception via the first audio playback device 30, thus enters a working mode of data interception, and acquires data packets delivered by the data source output device 20.

During the data interception process, the second audio playback device 40 is subjected to loss of a data packet with the serial number 5 for different reasons. As such, the data packet 5 is not present between the data packet 4 and the data packet 6, and it may be determined that the missing data packet is the data packet 5. The second audio playback device 40 requests the data packet 5 from the first audio playback device 30, to ensure integrity of the acquired data.

Figure 5:
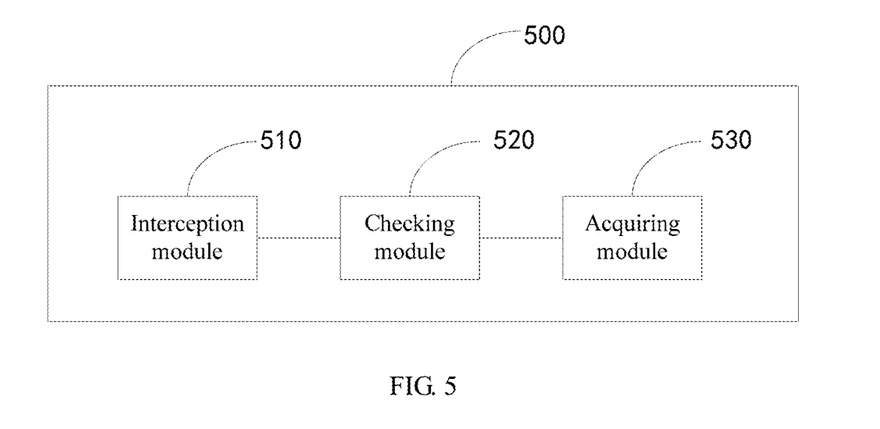
FIG. 5 is a schematic structural diagram of an apparatus for Bluetooth communication according to an embodiment of the present disclosure.

The present disclosure further provides an apparatus for Bluetooth communication corresponding to the above method embodiments. FIG. 5 is a functional block diagram of an apparatus for Bluetooth communication according to an embodiment of the present disclosure. As illustrated in FIG. 5, the apparatus 500 includes: an interception module 510, a checking module 520, and an acquiring module 530.

The interception module 510 is configured to acquire data packets from a data source device by means of data interception within at least a portion of a time period in a Bluetooth communication process. The data interception is a working mode that allows unidirectional acquisition of data packets delivered by the data source device in the Bluetooth communication process. The checking module 520 is configured to determine, according to a predetermined check mode, whether a first data set matches a second data set, wherein the first data set is formed by the data packets acquired by means of the data interception, and the second data set is formed by the data packets delivered in the Bluetooth communication process. The acquiring module 530 is configured to acquire a missing data packet in the first data set if the first data set does not match the second data set, so that the first data set matches the second data set.

The checking module 520 and the acquiring module 530 are employed to ensure integrity of the data acquired by the secondary device during the data interception process. The secondary device may determine whether there is a data packet missed by the checking module 520, and acquire the missing data packet from the primary device via the acquiring module 530.

In some embodiments, the checking module 520 is further configured to: assign contiguous data packet serial numbers to the data packets delivered in the Bluetooth communication process; judge whether data packet serial numbers of the data packet acquired by means of the data interception are contiguous; determine that the first data set does not match the second data set if the data packet serial numbers are not contiguous; and determine that the first data set matches the second data set if the data packet serial numbers are contiguous.

In some other embodiments, the acquiring module 530 is further configured to: determine a data packet missed in the first data set relative to the second data set; and acquire the missed data packet using a data receiving device that receives the data packets delivered in the Bluetooth communication process.

The data packet missed by the secondary device may be acquired via the primary device. With such operations, the primary device only needs to forward a small number of missing data packets, and thus the occupied bandwidth and data transmission load are both reduced.

It should be noted that since the apparatus embodiments and the method embodiments are based on the same inventive concept, and technical contents in the method embodiments may also be applied to the apparatus embodiments, which are thus not described herein any further.

One skilled in the art should be further aware that with reference to the embodiments of the present application disclosed herein, various exemplary Bluetooth communication steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system.

One skilled in the art may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Figure 6:
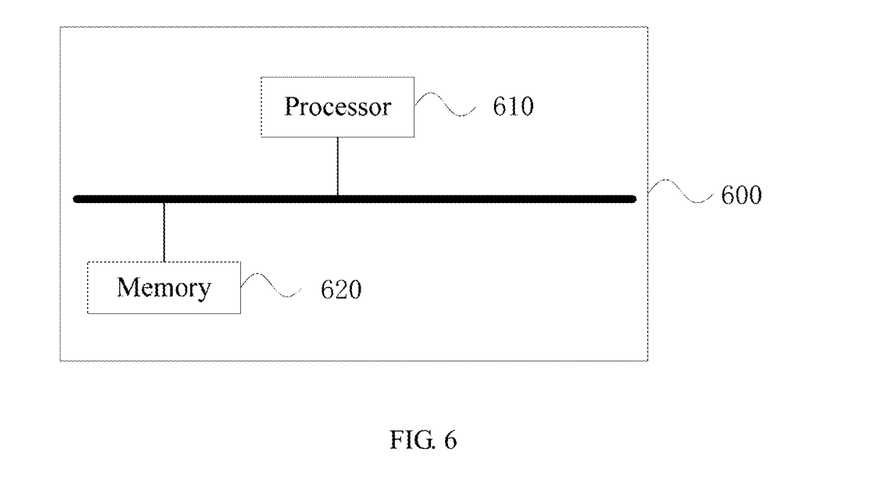
FIG. 6 is a schematic structural diagram of an electronic device according to an embodiment of the present disclosure.

An embodiment of the present disclosure further provides an electronic device. FIG. 6 is a schematic structural diagram of an electronic device according to an embodiment of the present disclosure. The electronic device 600 includes: a communication module, a memory 620, and a processor 610 coupled to the communication module and the memory 620.

The memory 620 stores instructions that are executable by the processor 610, and the processor 610 executes the instructions to cause the processor 610 to perform the steps in the above method embodiments via the communication module: for example, acquiring data packets from a data source device by means of data interception within at least a portion of a time period in a Bluetooth communication process, wherein the data interception is a working mode that allows unidirectional acquisition of data packets delivered by the data source device in the Bluetooth communication process. The electronic device 600 may be formed by at least one first audio playback device and several second audio playback devices in the application environment as illustrated in FIG. 1, for example, a 2.1 channel audio device, a stereo headphone or other multi-channel audio playback devices. The first audio playback device may act as a primary device, and the second audio playback devices may act as secondary devices to execute the working mode of data interception.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for Bluetooth communication, comprising:
   acquiring data packets from a data source device by means of data interception within at least a portion of a time period in a Bluetooth communication process, wherein the data interception is a working mode that allows unidirectional acquisition of data packets delivered by the data source device in the Bluetooth communication process;
   determining, according to a predetermined check mode, whether a first data set matches a second data set, wherein the first data set is formed by the data packets acquired by means of the data interception, and the second data set is formed by the data packets delivered in the Bluetooth communication process; and
   acquiring a missing data packet in the first data set if the first data set does not match the second data set, so that the first data set matches the second data set.

2. The method according to claim 1, wherein the determining, according to a predetermined check mode, whether a first data set matches a second data set, wherein the first data set is formed by the data packets acquired by means of the data interception, and the second data set is formed by the data packets delivered in the Bluetooth communication process comprises:
   assigning contiguous data packet serial numbers to the data packets delivered in the Bluetooth communication process;
   judging whether data packet serial numbers of the data packet acquired by means of the data interception are contiguous;
   determining that the first data set does not match the second data set if the data packet serial numbers are not contiguous; and
   determining that the first data set matches the second data set if the data packet serial numbers are contiguous.

3. The method according to claim 1, wherein the determining, according to a predetermined check mode, whether a first data set matches a second data set, wherein the first data set is formed by the data packets acquired by means of the data interception, and the second data set is formed by the data packets delivered in the Bluetooth communication process comprises:
   acquiring check symbols for identifying the data packets in the second data set;
   judging whether the data packets acquired by means of the data interception have corresponding check symbols;
   determining that the first data set does not match the second data set if the data packets do not have corresponding check symbols; and
   determining that the first data set matches the second data set if the data packets have corresponding check symbols.

4. The method according to claim 1, wherein the acquiring a missing data packet in the first data set if the first data set does not match the second data set, so that the first data set matches the second data set comprises:
   determining a data packet missed in the first data set relative to the second data set; and
   acquiring the missed data packet using a data receiving device that receives the data packets delivered in the Bluetooth communication process.

5. An electronic device, comprising:
   a memory; and
   a processor coupled to the memory, the memory storing instructions that are executable by the processor; wherein execution of the instructions by the processor causes the processor to:
   acquire data packets from a data source device by means of data interception within at least a portion of a time period in a Bluetooth communication process, wherein the data interception is a working mode that allows unidirectional acquisition of data packets delivered by the data source device in the Bluetooth communication process;
   determine, according to a predetermined check mode, whether a first data set matches a second data set, wherein the first data set is formed by the data packets acquired by means of the data interception, and the second data set is formed by the data packets delivered in the Bluetooth communication process; and
   acquire a missing data packet in the first data set if the first data set does not match the second data set, so that the first data set matches the second data set.

6. The electronic device according to claim 5, wherein the determining, according to a predetermined check mode, whether a first data set matches a second data set, wherein the first data set is formed by the data packets acquired by means of the data interception, and the second data set is formed by the data packets delivered in the Bluetooth communication process comprises:

assigning contiguous data packet serial numbers to the data packets delivered in the Bluetooth communication process;

judging whether data packet serial numbers of the data packet acquired by means of the data interception are contiguous;

determining that the first data set does not match the second data set if the data packet serial numbers are not contiguous; and determining that the first data set matches the second data set if the data packet serial numbers are contiguous.

7. The electronic device according to claim 5, wherein the determining, according to a predetermined check mode, whether a first data set matches a second data set, wherein the first data set is formed by the data packets acquired by means of the data interception, and the second data set is formed by the data packets delivered in the Bluetooth communication process comprises:

acquiring check symbols for identifying the data packets in the second data set;

judging whether the data packets acquired by means of the data interception have corresponding check symbols;

determining that the first data set does not match the second data set if the data packets do not have corresponding check symbols; and determining that the first data set matches the second data set if the data packets have corresponding check symbols.

8. The electronic device according to claim 5, wherein the acquiring a missing data packet in the first data set if the first data set does not match the second data set, so that the first data set matches the second data set comprises:

determining a data packet missed in the first data set relative to the second data set; and acquiring the missed data packet using a data receiving device that receives the data packets delivered in the Bluetooth communication process.

9. A system for Bluetooth communication, comprising a data source device configured to provide data, a data receiving device configured to establish Bluetooth communication with the data source device, and at least one secondary device; wherein the secondary device is configured to acquire data packets from the data source device by means of data interception within at least a portion of a time period in a Bluetooth communication process between the data source device and the data receiving device; and wherein the data interception is a working mode that allows unidirectional acquisition of data packets delivered by the data source device in the Bluetooth communication process;

wherein the secondary device and the data receiving device are configured to establish communication connection via at least one communication connection channel;

the secondary device is configured to judge whether a first data set matches a second data set according to a predetermined check mode, wherein the first data set is formed by the data packets acquired by means of the data interception, and the second data set is formed by data packets received by the data receiving device by means of Bluetooth communication within a corresponding time period; and the secondary device is configured to acquire a missing data packet in the first data set by the data receiving device if the first data set does not match the second data set, so that the first data set matches the second data set.

10. The system according to claim 9, wherein the data receiving device is configured to provide check symbols for the secondary device via the communication connection channel, wherein the check symbols are used for identifying the data packets in the second data set; and the secondary device is configured to determine, according to the check symbols, a data packet missed in the first data set relative to the second data set.

11. The system according to claim 9, wherein the secondary device is further configured to:

assign contiguous data packet serial numbers to the data packets delivered in the Bluetooth communication process;

judge whether data packet serial numbers of the data packet acquired by means of the data interception are contiguous;

determine that the first data set does not match the second data set if the data packet serial numbers are not contiguous; and determine that the first data set matches the second data set if the data packet serial numbers are contiguous.

12. The system according to claim 9, wherein the secondary device is further configured to:

acquire check symbols for identifying the data packets in the second data set;

judge whether the data packets acquired by means of the data interception have corresponding check symbols;

determine that the first data set does not match the second data set if the data packets do not have corresponding check symbols; and determine that the first data set matches the second data set if the data packets have corresponding check symbols.

13. The system according to claim 9, wherein the secondary device is further configured to:

determine a data packet missed in the first data set relative to the second data set; and acquire the missed data packet using a data receiving device that receives the data packets delivered in the Bluetooth communication process.

* * * * *